(12) United States Patent
Kanai et al.

(10) Patent No.: US 9,460,165 B2
(45) Date of Patent: Oct. 4, 2016

(54) RETRIEVAL DEVICE, RETRIEVAL SYSTEM, RETRIEVAL METHOD, RETRIEVAL PROGRAM, AND COMPUTER-READABLE RECORDING MEDIUM STORING RETRIEVAL PROGRAM

(75) Inventors: Yukiyo Kanai, Tokyo (JP); Tomomi Takase, Tokyo (JP)

(73) Assignee: Rakuten, Inc., Tokyo (JP)

( * ) Notice: Subject to any disclaimer, the term of this patent is extended or adjusted under 35 U.S.C. 154(b) by 433 days.

(21) Appl. No.: 13/991,767

(22) PCT Filed: Oct. 26, 2011

(86) PCT No.: PCT/JP2011/074697
§ 371 (c)(1),
(2), (4) Date: Jun. 25, 2013

(87) PCT Pub. No.: WO2012/077423
PCT Pub. Date: Jun. 14, 2012

(65) Prior Publication Data
US 2013/0268525 A1 Oct. 10, 2013

(30) Foreign Application Priority Data
Dec. 9, 2010 (JP) ................................. 2010-274873

(51) Int. Cl.
*G06F 17/30* (2006.01)
*G06Q 30/02* (2012.01)

(52) U.S. Cl.
CPC ... *G06F 17/30554* (2013.01); *G06F 17/30864* (2013.01); *G06F 17/30867* (2013.01); *G06Q 30/02* (2013.01)

(58) Field of Classification Search
CPC .......... G06F 17/3089; G06F 17/3053; G06F 17/30867; G06F 17/30; G06F 17/30598; G06F 17/30696; G06F 17/30699; G06F 17/30743; G06F 17/30749; G06F 17/30766; G06F 17/30876; G06F 17/3064; G06F 17/30864

USPC .................................................. 707/726, 767
See application file for complete search history.

(56) References Cited

U.S. PATENT DOCUMENTS

| 8,423,540 | B2 | 4/2013 | Chatani |
| 2005/0071251 | A1* | 3/2005 | Linden et al. .................. 705/26 |
| 2009/0228918 | A1* | 9/2009 | Rolff et al. ..................... 725/34 |
| 2011/0047013 | A1* | 2/2011 | McKenzie, III ....... G06Q 10/10 705/14.4 |
| 2011/0264737 | A1* | 10/2011 | Skinner ........................ 709/204 |

(Continued)

FOREIGN PATENT DOCUMENTS

| JP | 2009-123192 A | 6/2009 |
| JP | 2009-223372 A | 10/2009 |
| JP | 2010-026666 A | 2/2010 |

OTHER PUBLICATIONS

Herlocker, Jonathan L., Joseph A. Konstan, and John Riedl. "Explaining collaborative filtering recommendations." Proceedings of the 2000 ACM conference on Computer supported cooperative work. ACM, 2000.*

(Continued)

*Primary Examiner* — Nan Hutton
(74) *Attorney, Agent, or Firm* — Sughrue Mion, PLLC

(57) ABSTRACT

An EC server (30) includes an extraction unit (33) that extracts comment data indicating a second comment (comment on a second item) containing a link to a first comment (comment on a first item) from a comment database (10), an association unit (34) that generates associated item data indicating association between the first and second items based on the comment data and stores the associated item data into an associated item database (35), a receiving unit (36) that receives a request for item information from a user terminal T, a retrieval unit (37) that refers to an item database (31) and the associated item database (35) and extracts item information (designated item information) indicated by the signal and item information (associated item information) related to that item information, and a transmitting unit (38) that transmits those item information to the user terminal T.

7 Claims, 9 Drawing Sheets

(56) References Cited

U.S. PATENT DOCUMENTS

2011/0320373 A1* 12/2011 Lee et al. .................. 705/319
2012/0124072 A1* 5/2012 Vaidyanathan et al. ...... 707/767

OTHER PUBLICATIONS

Schafer, J. Ben, Joseph Konstan, and John Riedl. "Recommender systems in e-commerce." Proceedings of the 1st ACM conference on Electronic commerce. ACM, 1999.*

Japanese Office Action dated Jul. 24, 2012, issued in Japanese Patent Application No. 2010-274873.
Mitsuo Yoshida, et al., "Analysis of Tweets including URLs on Twitter", Dai 2 Kai Forum on Engineering and Information Management, DEIM Forum 2010, Jun. 9, 2010, pp. 1-7, A5-1.
Kyoko Ariyasu, et al., "An Intelligence Circulation System Based on Analyses of Viewers Comments", IEICE Technical Report, Jan. 8, 2009, pp. 5-9, vol. 108, No. 378.
English Translation of Written Opinion dated Jun. 20, 2013, issued in International Patent Application No. PCT/JP2011/074697.

* cited by examiner

Fig.5

| ITEM ID | (ASSOCIATED) ITEM ID | SCORE | COMMON ATTRIBUTE |
|---|---|---|---|
| ITEM X | ITEM Y | 3 (HIGH) | AGE GROUP=30S, OCCUPATION=OFFICE WORKER |
| ITEM X | ITEM Z | 1 (LOW) | AGE GROUP=30S |
| ITEM A | ITEM B | 2 (INTERMEDIATE) | (NONE) |
| ... | ... | ... | ... | described Patent Literature

RETRIEVAL DEVICE, RETRIEVAL SYSTEM, RETRIEVAL METHOD, RETRIEVAL PROGRAM, AND COMPUTER-READABLE RECORDING MEDIUM STORING RETRIEVAL PROGRAM

CROSS REFERENCE TO RELATED APPLICATIONS

This application is a National Stage of International Application No. PCT/JP2011/074697, filed on Oct. 26, 2011, claiming priority from Japanese Patent Application No. 2010-274873, filed Dec. 9, 2010, the contents of all of which are incorporated herein by reference in their entirety.

TECHNICAL FIELD

One embodiment of the present invention relates to a retrieval device, a retrieval system, a retrieval method, a retrieval program, and a computer-readable recording medium storing retrieval program that retrieve item information.

BACKGROUND ART

A technique that presents not only information of an item desired by a user but also information of another item related to that item has been used in an electronic commerce site or the like. For example, the below-described Patent Literature 1 discloses a related information presentation system that presents related information that has relevance to certain information and is surprising to a user. The related information presentation system stores link information that associates a plurality of information and repeats processing of selecting information related to given information several times by applying the link information. As a result of this processing, the related information presentation system selects information that is indirectly related to the base information and presents the selected information to a user. When the given information is an introduction of an item, the related information presentation system can associate a plurality of items with each other.

CITATION LIST

Patent Literature

PTL 1: JP 2010-026666 A

SUMMARY OF INVENTION

Technical Problem

In the system disclosed in the above Patent Literature 1, unless two words that are associated with each other by the link information are contained in each of one introduction and another introduction, those introductions cannot be associated with each other. In other words, in this system, the association of items depends on words in introductions.

It is thus desirable to associate items without depending on words in comments related to the items and present item information to a user.

Solution to Problem

A retrieval device according to one aspect of the present invention includes an extraction means for referring to a comment storage means for storing comment data indicating a comment on an item by a user and extracting comment data indicating a second comment containing a link to a first comment, the first comment being a comment on a first item by a first user and the second comment being a comment on a second item by a second user; an association means for generating associated item data indicating that the first and second items are associated with each other based on the comment data extracted by the extraction means and storing the associated item data into an associated item storage means; a receiving means for receiving a request for information about one item of the first and second items from a user terminal; a retrieval means for referring to an item storage means for storing item information and extracting designated item information about the one item corresponding to the request received by the receiving means, and referring to the item storage means and the associated item storage means and extracting associated item information about another item of the first and second items; and a transmitting means for transmitting the designated item information and the associated item information extracted by the retrieval means to the user terminal.

A retrieval system according to one aspect of the present invention includes an extraction means for referring to a comment storage means for storing comment data indicating a comment on an item by a user and extracting comment data indicating a second comment containing a link to a first comment, the first comment being a comment on a first item by a first user and the second comment being a comment on a second item by a second user; an association means for generating associated item data indicating that the first and second items are associated with each other based on the comment data extracted by the extraction means and storing the associated item data into an associated item storage means; a receiving means for receiving a request for information about one item of the first and second items from a user terminal; a retrieval means for referring to an item storage means for storing item information and extracting designated item information about the one item corresponding to the request received by the receiving means, and referring to the item storage means and the associated item storage means and extracting associated item information about another item of the first and second items; and a transmitting means for transmitting the designated item information and the associated item information extracted by the retrieval means to the user terminal.

A retrieval method according to one aspect of the present invention is a retrieval method executed by a computer, including an extraction step of referring to a comment storage means for storing comment data indicating a comment on an item by a user and extracting comment data indicating a second comment containing a link to a first comment, the first comment being a comment on a first item by a first user and the second comment being a comment on a second item by a second user; an association step of generating associated item data indicating that the first and second items are associated with each other based on the comment data extracted in the extraction step and storing the associated item data into an associated item storage means; a receiving step of receiving a request for information about one item of the first and second items from a user terminal; a retrieval step of referring to an item storage means for storing item information and extracting designated item information about the one item corresponding to the request received in the receiving step, and referring to the item storage means and the associated item storage means and extracting associated item information about another item of the first and second items; and a transmitting step of transmitting the designated item information and the associated item information extracted in the retrieval step to the user terminal.

A retrieval program according to one aspect of the present invention causes a computer to function as an extraction means for referring to a comment storage means for storing comment data indicating a comment on an item by a user and extracting comment data indicating a second comment containing a link to a first comment, the first comment being a comment on a first item by a first user and the second comment being a comment on a second item by a second user; an association means for generating associated item data indicating that the first and second items are associated with each other based on the comment data extracted by the extraction means and storing the associated item data into an associated item storage means; a receiving means for receiving a request for information about one item of the first and second items from a user terminal; a retrieval means for referring to an item storage means for storing item information and extracting designated item information about the one item corresponding to the request received by the receiving means, and referring to the item storage means and the associated item storage means and extracting associated item information about another item of the first and second items; and a transmitting means for transmitting the designated item information and the associated item information extracted by the retrieval means to the user terminal.

A computer-readable recording medium according to one aspect of the present invention stores a retrieval program causing a computer to function as an extraction means for referring to a comment storage means for storing comment data indicating a comment on an item by a user and extracting comment data indicating a second comment containing a link to a first comment, the first comment being a comment on a first item by a first user and the second comment being a comment on a second item by a second user; an association means for generating associated item data indicating that the first and second items are associated with each other based on the comment data extracted by the extraction means and storing the associated item data into an associated item storage means; a receiving means for receiving a request for information about one item of the first and second items from a user terminal; a retrieval means for referring to an item storage means for storing item information and extracting designated item information about the one item corresponding to the request received by the receiving means, and referring to the item storage means and the associated item storage means and extracting associated item information about another item of the first and second items; and a transmitting means for transmitting the designated item information and the associated item information extracted by the retrieval means to the user terminal.

According to the aspects described above, when one comment (comment on a second item by a second user) contains a link to another comment (a link to a comment on a first item by a first user), two items corresponding to those comments are associated with each other. Then, when a request related to one of the two items is sent from the user terminal, not only information (designated item information) about the one item but also information (associated item information) about the other item associated with that item is extracted, and those item information are sent to the user terminal. In this manner, because the items are associated with each other depending on the presence or absence of a link to a comment on another item, it is possible to associate the items without depending on a word in the comment and present the item information to a user.

In another aspect, the association means may determine whether a specified word is included in the second comment indicated by the extracted comment data and, when the specified word is included, add a higher score to the associated item data than when not, and, when a plurality of associated item information are extracted, the retrieval means may sort the plurality of associated item information so that the associated item information with the higher score is displayed preferentially on the user terminal.

In yet another aspect, the association means may determine whether categories of the first and second items are common by referring to the item storage means and, when the categories are common, add a higher score to the associated item data than when not, and when a plurality of associated item information are extracted, the retrieval means may sort the plurality of associated item information so that the associated item information with the higher score is displayed preferentially on the user terminal.

In still another aspect, the association means may refer to a user storage means for storing user information and add a user attribute common to the first and second users to the associated item data, and the retrieval means may extract the user information about a user of the user terminal from the user storage means and, when a user attribute indicated by the user information corresponds to the common user attribute added to the extracted associated item information, determine to transmit the associated item information to the user terminal and, when not, determine not to transmit the associated item information to the user terminal.

In still another aspect, when the first comment cannot be uniquely specified from the link contained in the second comment, the extraction means may determine that the link is a link to a comment by the first user when a difference between created time of the comment by the first user and created time of the second comment is equal to or less than a specified threshold, and the association means may generate the associated item data, treating an item on which the comment by the first user determined to be a linked comment is made as the first item.

Advantageous Effects of Invention

According to one aspect of the invention, because items are associated with each other depending on the presence or absence of a link to a comment on another item, it is possible to associate the items without depending on words in comments and present item information to a user.

BRIEF DESCRIPTION OF DRAWINGS

FIG. 5 is a diagram showing an example of associated item data.

DESCRIPTION OF EMBODIMENTS

An embodiment of the present invention is described hereinafter in detail with reference to the appended drawings. In this embodiment, a retrieval device and a retrieval system according to one embodiment of the invention are applied to an electronic commerce server (EC server) and an electronic commerce system (EC system), respectively. Note that, in the description of the drawings, the same or equivalent elements are denoted by the same reference symbols, and the redundant explanation thereof is omitted.

Figure 1:
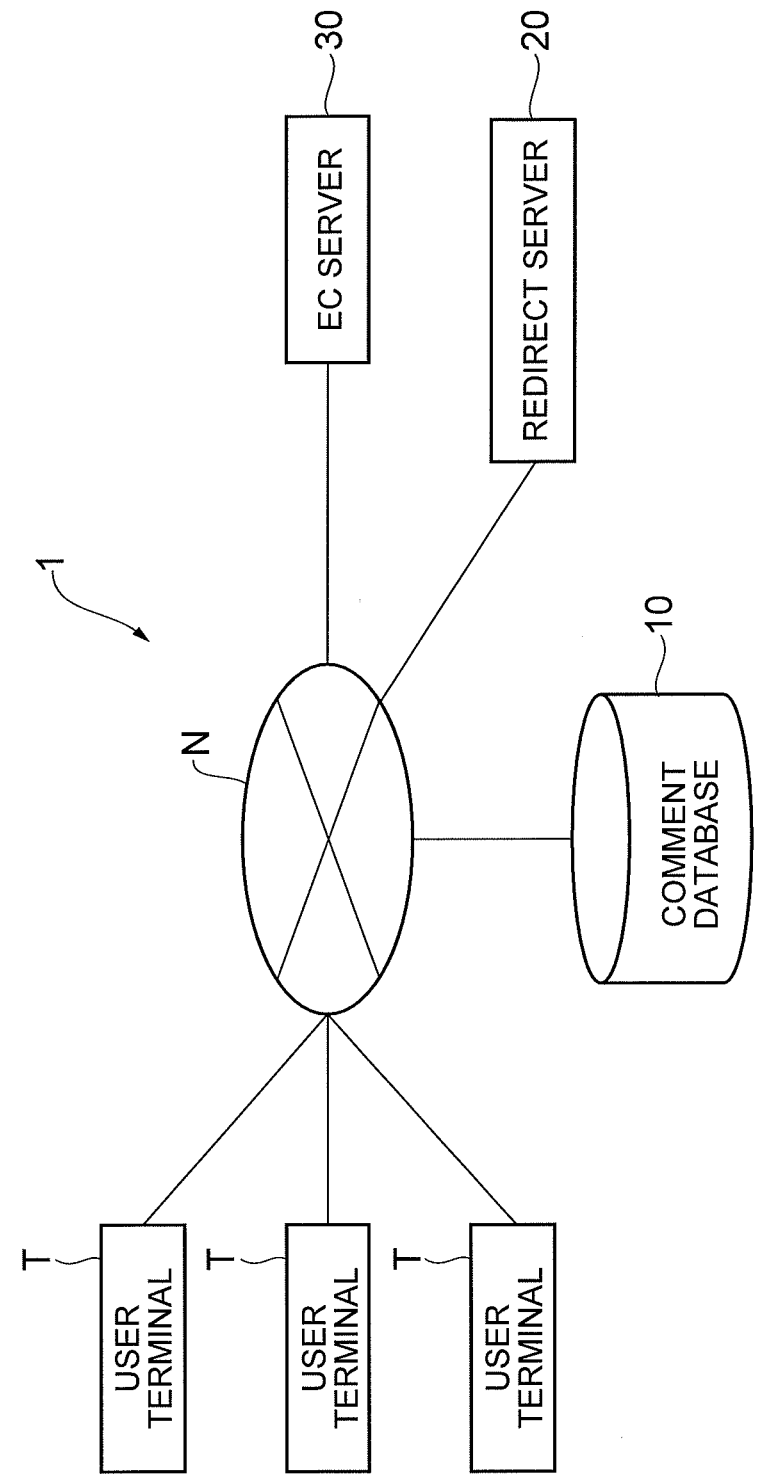
FIG. 1 is a diagram showing the overall configuration of an EC system according to an embodiment.

First, the functions and configuration of an EC system 1 according to an embodiment are described with reference to FIGS. 1 to 6. The EC system 1 is a computer system that provides a means of so-called online shopping to users (consumers). The EC system 1 has a function of accepting comments (introductions) by users on items in addition to a function of presenting item information to users and a function of payment. As shown in FIG. 1, the EC system 1 includes a plurality of user terminals T, a comment database (comment storage means) 10, a redirect server 20, and an EC server 30. The user terminals T, the comment database 10, the redirect server 20 and the EC server 30 can communicate with one another through a network N such as the Internet.

The user terminal T is a computer owned by a user and it may be an advanced mobile phone (smart phone), a personal computer or the like, for example. A user can access a website for online shopping through the user terminal T and view item information, purchase an item and create a comment on an item. Although three user terminals T are shown in FIG. 1, the number of user terminals T in the EC system 1 is not particularly limited.

The comment database 10 is a computer that stores comment data indicating a comment (introduction) on an item by a user. When the operation to enter and send a comment is done through a page to enter a comment (for example, a microblogging page) displayed on the user terminal T, the comment data generated in the user terminal T is sent to the network N and then stored into the comment database 10. The comment data contains a user ID that identifies a user (comment author), a comment containing URL of an item, URL of the comment, and time when the comment is made.

The registration of the comment data into the comment database 10 is described hereinafter with reference to FIG. 2. In this embodiment, it is assumed that a user can access a page to create a comment (comment page) by clicking on "introduce" button on a page (item page) where item information is shown. Note that the way of accessing the comment page is not limited thereto, and a user may move to the comment page from a webpage different from the item page.

When a user A moves from a page Px of an item X to a his/her own comment page Pa and enters and registers a comment Ca "This is a masterpiece. http://abc.to/xxxxx", comment data Da is stored into the comment database 10. "http://abc.to/xxxxx/" in the comment Ca is the redirect URL to the page of the item X. When an access is made to the URL "http://abc.to/xxxxx/", it is redirected to the original page Px (http://www.example.com/item/x/) of the item X. Although the redirect URL is set for the purpose of shortening the character string of the original URL, the redirect URL is also the URL of the item.

After that, another user B who has read the comment Ca by the user A moves from a page Py of an item Y to a his/her own comment page Pb and enters and registers a comment Cb "@user_a RT http://abc.to/yyyyy/ This is also impressive", comment data Db is stored into the comment database 10. "http://abc.to/yyyyy/" in the comment Cb is the redirect URL to the page of the item Y. Further, "@user_a" is a link to the comment by the user A. "RT" indicates that the comment Cb is reposting of the comment by the user A. Note that, although the comments in FIG. 2 are based on the specifications of Twitter (registered trademark), the type of a service related to the entry of comments is not particularly limited. Accordingly, the way of representing reply, reposting and the like is also not limited to "@" and "RT" but is dependent on the specifications of the service for the entry of comments.

In this manner, the comment data corresponding to replay to a certain comment or reposting of a certain comment can be also stored in the comment database 10. The replay comment and the reposted comment contains a link (URL) to another user's comment such as "@user_a" in the comment Cb.

The redirect server 20 is a computer that performs URL redirection in response to a page request from the user terminal T. The redirect server 20 stores correspondence between a requested URL and a destination URL, and acquires the destination URL corresponding to the URL indicated by the page request and transmits it to the user terminal T. The user terminal T can thereby access the destination URL.

For example, when the URL "http://abc.to/xxxxx/" in the comment Ca is clicked on in a certain user terminal T, the redirect server gives the original URL "http://www.example.com/item/x/" corresponding to that URL back to the user terminal T. Further, when the URL "http://abc.to/yyyyy/" in the comment Cb is clicked on in a certain user terminal T, the redirect server 20 gives the original URL "http://www.example.com/item/y/" corresponding to that URL back to the user terminal T.

Figure 3:
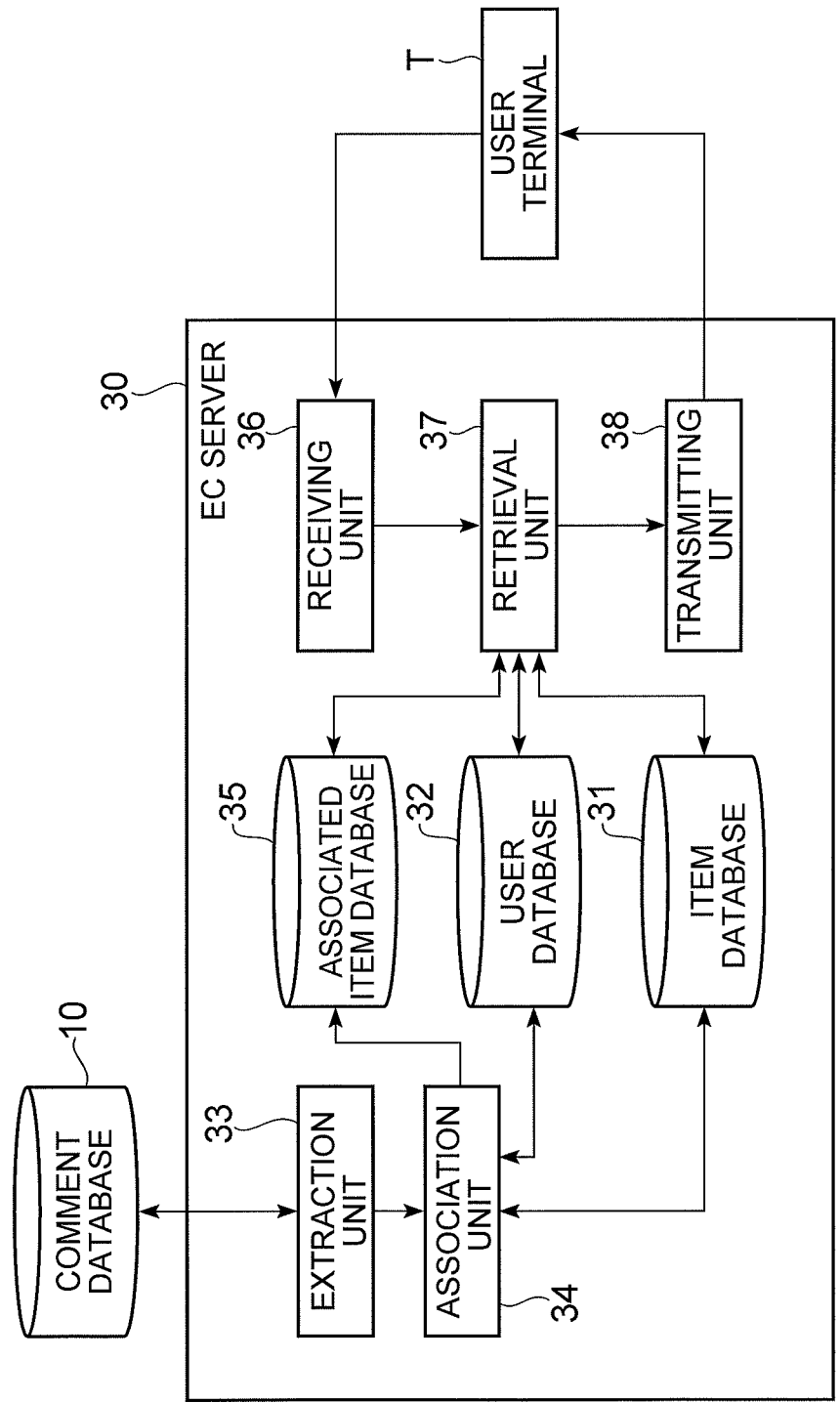
FIG. 3 is a block diagram showing the functional configuration of an EC server shown in FIG. 1.

The functions and configuration of the EC server 30 are described in detail below. The EC server 30 is a computer that executes the major functions of online shopping, such as presentation of item information and purchase processing. As shown in FIG. 3, the EC server 30 includes, as functional components, an item database (item storage means) 31, a user database (user storage means) 32, an extraction unit (extraction means) 33, an association unit (association means) 34, an associated item database (associated item storage means) 35, a receiving unit (receiving means) 36, a retrieval unit (retrieval means) 37, and a transmitting unit (transmitting means) 38.

Figure 4:
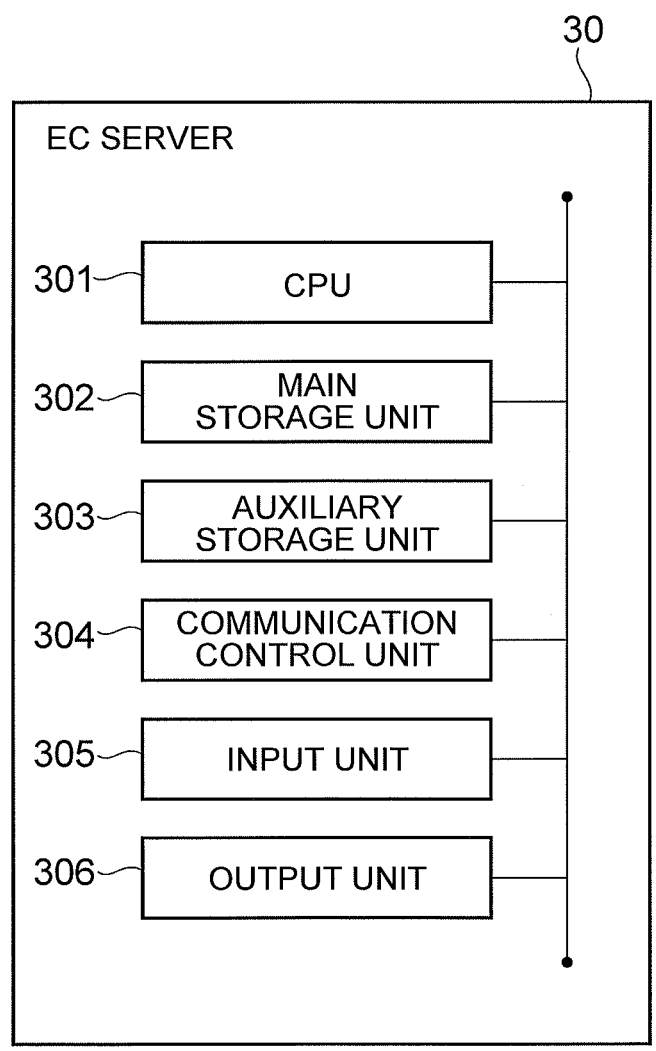
FIG. 4 is a diagram showing the hardware configuration of the EC server shown in FIG. 1.

As shown in FIG. 4, the EC server 30 is composed of a CPU 301 that executes an operating system, an application program and the like, a main storage unit 302 such as ROM and RAM, an auxiliary storage unit 303 such as a hard disk, a communication control unit 304 such as a network card, an input unit 305 such as a keyboard and a mouse, and an output unit 306 such as a monitor. The functions of the EC server 30 are implemented by loading given software onto the CPU 301 or the main storage unit 302, making the communication control unit 304, the input unit 305, the output unit 306 and the like operate under control of the CPU 301, and performing reading and writing of data in the main storage unit 302 or the auxiliary storage unit 303. The data and database required for processing are stored in the main storage unit 302 or the auxiliary storage unit 303.

Referring back to FIG. 3, the item database 31 is a means of storing item information. The item information is information in which an item ID that uniquely identifies an item is associated with various item attributes such as an item name, a category name and an item image. Note that the item attribute contained in the item information may be set arbitrarily.

The user database 32 is a means of storing user information. The user information is information in which a user ID that uniquely identifies a user is associated with various user attributes such as a user name, age and occupation. Note that the user attribute contained in the user information may be set arbitrarily.

The extraction unit 33 is a means of extracting comment data indicating a comment (referring comment, second comment) containing a link to another comment (referred comment, first comment) from the comment database 10. Note that a comment author and an item on which the comment is made need to be different between the referred comment and the referring comment.

Figure 2:
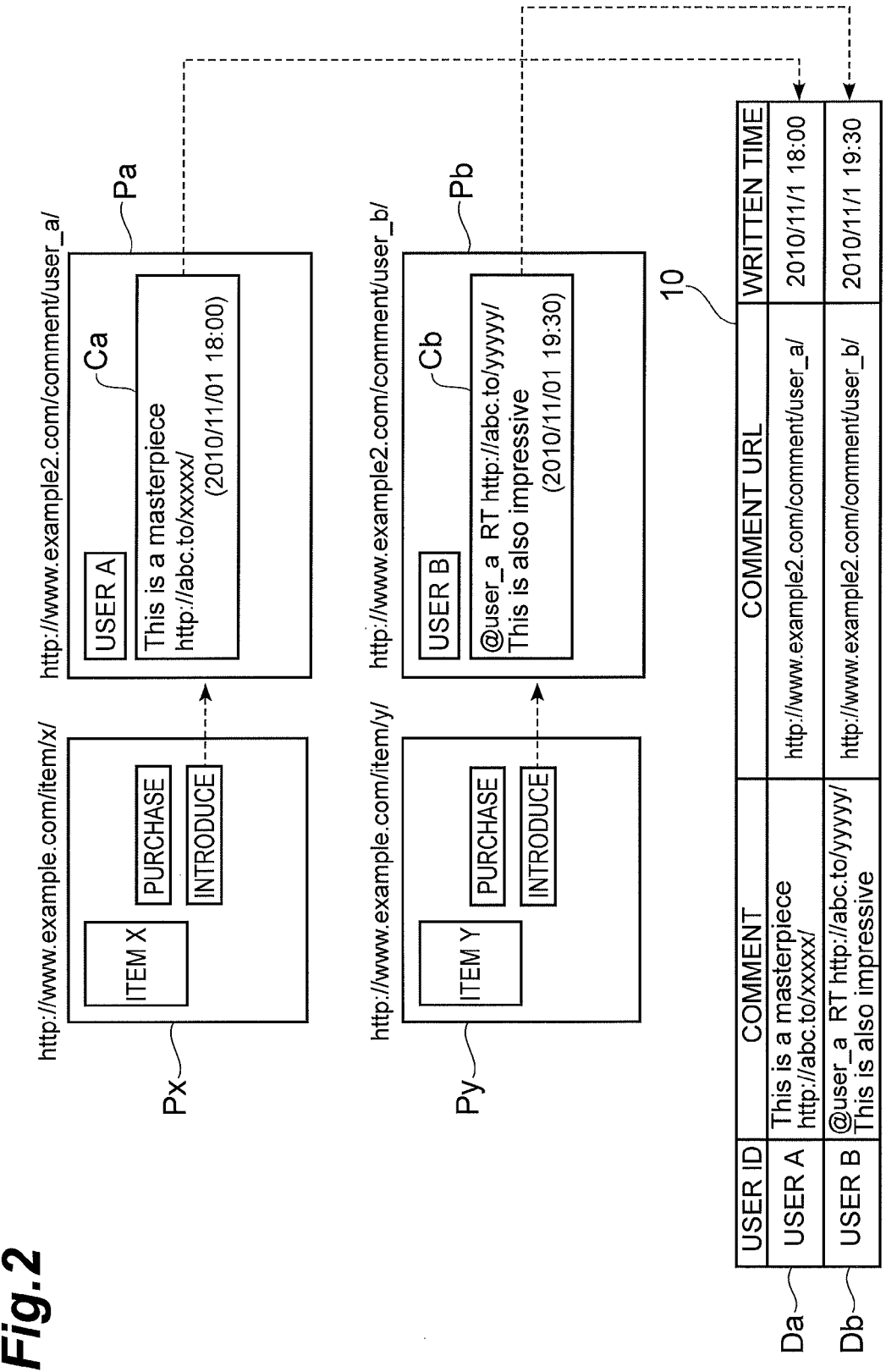
FIG. 2 is a diagram to explain entry and registration of comments.

Referring to the example of FIG. 2, because a link to another comment is not contained in the comment Ca of the comment data Da, the extraction unit 33 does not extract the comment data Da. On the other hand, a link "@user_a" to another user's comment is contained in the comment Cb of the comment data Db. Thus, the extraction unit 33 treats the comment data Db as a candidate for extraction.

Determination as to whether a link indicates another user or not can be made by analyzing the link. However, it cannot be determined which comment by another user the link indicates only by analyzing the link in some cases. An example of the case that one comment cannot be specified from a link is where a comment is created by Retweet (RT) function in Twitter (registered trademark).

In the case where the link "@user_a" in the comment Cb indicates one of a plurality of comments written by the user A, the extraction unit 33 can specify the item on which the user A has made a comment by analyzing the link and referring to the item database 31. Further, the extraction unit 33 can specify the item on which the user B has made a comment by analyzing the URL "http://abc.to/yyyyy/" in the comment Cb or a webpage specified by the URL and referring to the item database 31. Then, the extraction unit 33 determines whether the two items specified by the user A and B are different or not, and finally extracts the comment data Db only when those items are different from each other.

On the other hand, in the case where the comment page of the user A can be specified form the link "@user_a" in the comment Cb but one of a plurality of comments contained in the page cannot be specified, the extraction unit 33 estimates the corresponding comment by the following way. Specifically, the extraction unit 33 determines whether the comment data (which is referred to hereinafter as "corresponding comment data") of the user A which is registered before the comment data Db and in which a difference in written time (created time) from the comment data Db is within a specified threshold Th exists or not. The corresponding comment data is data of the comment that is determined to be a linked comment. Note that the threshold Th may be set arbitrarily (for example, 5 hours, 24 hours etc.)

When there is no corresponding comment data, the extraction unit 33 does not finally extract the comment data Db. On the other hand, when there are one or a plurality of corresponding comment data, the extraction unit 33 specifies the item on which a comment is made in each of the corresponding comment data and determines whether the specified item and the item on which the comment Cb is made are different or not. Then, the extraction unit 33 finally extracts the comment data Db only when the both items are different from each other. In the example of FIG. 2, even when the comment Ca cannot be directly found through the link "@user_a", the extraction unit 33 can finally extract the comment data Db if the threshold Th is set to 1.5 hour or longer.

The extraction unit 33 performs the process of determination and extraction for each of the comment data in the comment database 10. Then, when one or more comment data can be extracted, the extraction unit 33 outputs the extracted comment data to the association unit 34.

The association unit 34 is a means of generating associated item data indicating that two items are associated with each other based on the comment data input from the extraction unit 33. The association unit 34 generates one or a plurality of associated item data by performing the following processing on each of the input one or plurality of comment data and stores the generated associated item data into the associated item database 35.

The association unit 34 specifies one item (second item) from the URL contained in the comment (referring comment, second comment) of the comment data. Further, the association unit 34 specifies another item (first item; which is also referred to hereinafter as "corresponding item") based on a link to another comment (referred comment, first comment) contained in that comment. A method of specifying the corresponding item is the same as the method used in the extraction unit 33. Then, the association unit 34 associates two item IDs (two item IDs of the first and second items) with each other and thereby generates the associated item data. In the case where a plurality of corresponding items are specified from a link to the referred comment, the association unit 34 may generate the associated item data for each of the corresponding items or may generate the associated item data for one corresponding item (for example, the item indicated by the referred comment whose difference in written time is the shortest) of the plurality of corresponding items.

Then, the association unit 34 adds a score to the generated associated item data. The score is a value indicating the strength of association between items, and, as the association is stronger, a higher value is set as the score. In this embodiment, the following two examples are described as a method of setting the score. Note that a method of representing the score is not particularly limited. For example, the score may be expressed in three levels: 1 (low), 2 (intermediate) and 3 (high), five levels, or integers from 0 to 100.

[1. Setting Based on Result of Morphological Analysis]

The association unit 34 morphologically analyzes the referring comment and determines whether a specified word is included in the referring comment. The "specified word" is a word from which it can be estimated that a comment is made on another item based on the assumption that there is an item on which a comment is already made by another user, which is an item indicated by the referred comment. An example of the "specified word" is the adverb "also" indicating that there is another relevant matter in the comment Cb of FIG. 2, though not limited thereto. For example, the determiner "more" representing a standard or reference of comparison may be set as the specified word, or the demonstratives such as "that" and "this" may be set as the specified word. When the specified word is included, the association unit 34 adds a higher score to the associated item data than when such a word is not included. The association unit 34 may set a different score for each specified word.

[2. Setting Based on Category of Item]

The association unit 34 reads the category names of two associated items from the item database 31 and determines whether the both categories are common or not. The "common" categories mean that the both categories are the same or similar, or one category includes another category. For this determination, the association unit 34 pre-stores data that define the commonality of categories. When the both categories are common, the association unit 34 adds a higher score to the associated item data than when not. The association unit 34 may set a different score according to the commonality of categories.

Further, the association unit 34 adds a common attribute to the associated item data. The common attribute is set based on the user attributes of two users who have made comments on two items associated with each other. Specifically, the association unit 34 reads the two user attributes from the user database 32 and, when the user attributes are the same or similar or one attribute includes another attribute, the association unit 34 sets the same, similar or common point as the common attribute.

Hereinafter, the setting of the common attribute related to age and occupation is described as an example. For example, when the ages of two users are 30 and 35, and the occupations are both office worker, the association unit 34 can add the common attribute including two entries "age group=30 s" and "occupation=office worker" to the associated item data. Alternatively, the association unit 34 may add the common attribute including only one entry "occupation=office worker" on condition that the ages should be the same.

In another example, assuming that the ages of two users are 30 and 45, and the occupations are "company executive" and "self-employed worker", and the age groups of the two users are different from each other, the association unit 34 can add the common attribute including only one entry "working mode=company management" to the associated item data. Alternatively, the association unit 34 may refrain from setting the common attribute on condition that the occupations should be the same.

The type and number of user attributes that are referred to when setting the common attribute and the type and number of entries that are set as the common attribute are not limited. For example, the association unit 34 may set the common attribute related to the gender in addition to the age and the occupation described above or may set the common attribute related only to the age.

After generating the associated item data with the score and the common attribute in the above manner, the association unit 34 stores the associated item data into the associated item database 35. The common attribute, however, is not always set.

The associated item database 35 is a means of storing the associated item data input from the association unit 34. FIG. 5 shows an example of the stored associated item data. In FIG. 5, two item IDs: the item X and the item Y, for example, are associated with each other, the strength of association is 3 (high), and the common attribute related to the age group and the occupation is set. There is a case where a plurality of item IDs are associated with one item ID, such as the item X. Further, the common attribute is not set to the associated item data for the items A and B. In the example of FIG. 5, the score is expressed in three levels.

The receiving unit 36 is a means of receiving a request signal that requests information about an item from the user terminal T. The request signal contains a user ID of a user (user of the user terminal T) who is logging in the EC site and one item ID input in the user terminal T. The receiving unit 36 outputs the received request signal to the retrieval unit 37.

The retrieval unit 37 is a means of extracting information about the item indicated by the request signal input from the receiving unit 36 and information about another item related to that item from the item database 31.

The retrieval unit 37 extracts the user ID and the item ID from the request signal. Next, the retrieval unit 37 extracts the item information corresponding to the item ID from the item database 31 as designated item information. Then, the retrieval unit 37 refers to the associated item database 35 using the item ID (designated item ID) of the extracted designated item information as a search condition, and determines whether the corresponding associated item data exists or not.

When the associated item data corresponding to the designated item ID is not found, the retrieval unit 37 generates a retrieval result only containing the designated item information.

On the other hand, when one or more associated item data are found, the retrieval unit 37 refers to the item database 31 using one or more item IDs (associated item IDs) associated with the designated item ID as a search condition, and extracts one or more item information corresponding to the one or more associated item IDs as associated item information. The retrieval unit 37 then associates the score and the common attribute in the associated item data with the associated item information.

After that, the retrieval unit 37 reads the user attribute corresponding to the user ID (the user ID of a searcher) extracted from the request signal from the user database 32 and compares the user attribute with the common attribute associated with each of the associated item information. Then, the retrieval unit 37 leaves only the associated item information where the attribute of the searcher corresponds to the common attribute and discards the other associated item information. In other words, the retrieval unit 37 selects related information to be transmitted to the user terminal T. This processing intends to present to the searcher only the associated item on which a comment is made by a user whose user attribute is common to that of the searcher. When no common attribute is set, the retrieval unit 37 does not compare the user attribute and transmits all of the extracted associated item information.

In the case where one or more associated item information remain after the above-described selection process, the retrieval unit 37 generates a retrieval result containing the designated item information and the associated item information. At this time, when a plurality of associated item information remain, the retrieval unit 37 sorts the associated item information in descending order of the score. This sorting is made in order to display the associated item information from the highest score to the lowest score; in other words, to preferentially display the associated item information with the higher score, on the user terminal T.

Finally, the retrieval unit 37 outputs the retrieval result generated as above to the transmitting unit 38.

An example of the retrieval process is described hereinafter on the assumption of the associated item data of FIG. 5. In the case where the item ID "item X" is extracted from the request signal, the retrieval unit 37 acquires the item information (designated item information) of the item X and the item information (associated item information) of the items Y and Z.

When the age and occupation of the user corresponding to the user ID extracted from the request signal is 30 and office worker, respectively, the retrieval unit 37 selects the item information of the items Y and Z as information to be transmitted. Accordingly, the retrieval unit 37 finally outputs the designated item information (the item X) and two associated item information (the items Y and Z) as a retrieval result to the transmitting unit 38. At this time, the retrieval unit 37 sorts the associated item information so that the two associated item information are displayed in the order of the items Y and Z.

When the age and occupation of the user corresponding to the user ID extracted from the request signal is 30 and unemployed, respectively, the retrieval unit 37 discards the item information of the item Y where the attribute related to the occupation is different. Accordingly, the retrieval unit 37 finally outputs the designated item information (the item X) and one associated item information (the item Z) as a retrieval result to the transmitting unit 38.

When the age and occupation of the user corresponding to the user ID extracted from the request signal is 45 and office worker, respectively, the retrieval unit 37 discards the item information of the items Y and Z where the attribute related to the age group is different. Accordingly, the retrieval unit 37 finally outputs only the designated item information (the item X) as a retrieval result to the transmitting unit 38.

In another example, in the case where the item ID "item B" is extracted from the request signal, the retrieval unit 37 acquires the item information (designated item information) of the item B and the item information (associated item information) of the item A. Because the common attribute is not set to the associated item data of the items A and B, the retrieval unit 37 outputs the acquired designated item information and associated item information as a retrieval result to the transmitting unit 38 without taking the user attribute of the searcher into consideration.

The transmitting unit 38 is a means of transmitting the retrieval result input from the retrieval unit 37 to the user terminal T from which the request signal has been transmitted. One or more item information are thereby displayed on the user terminal T.

Figure 6:
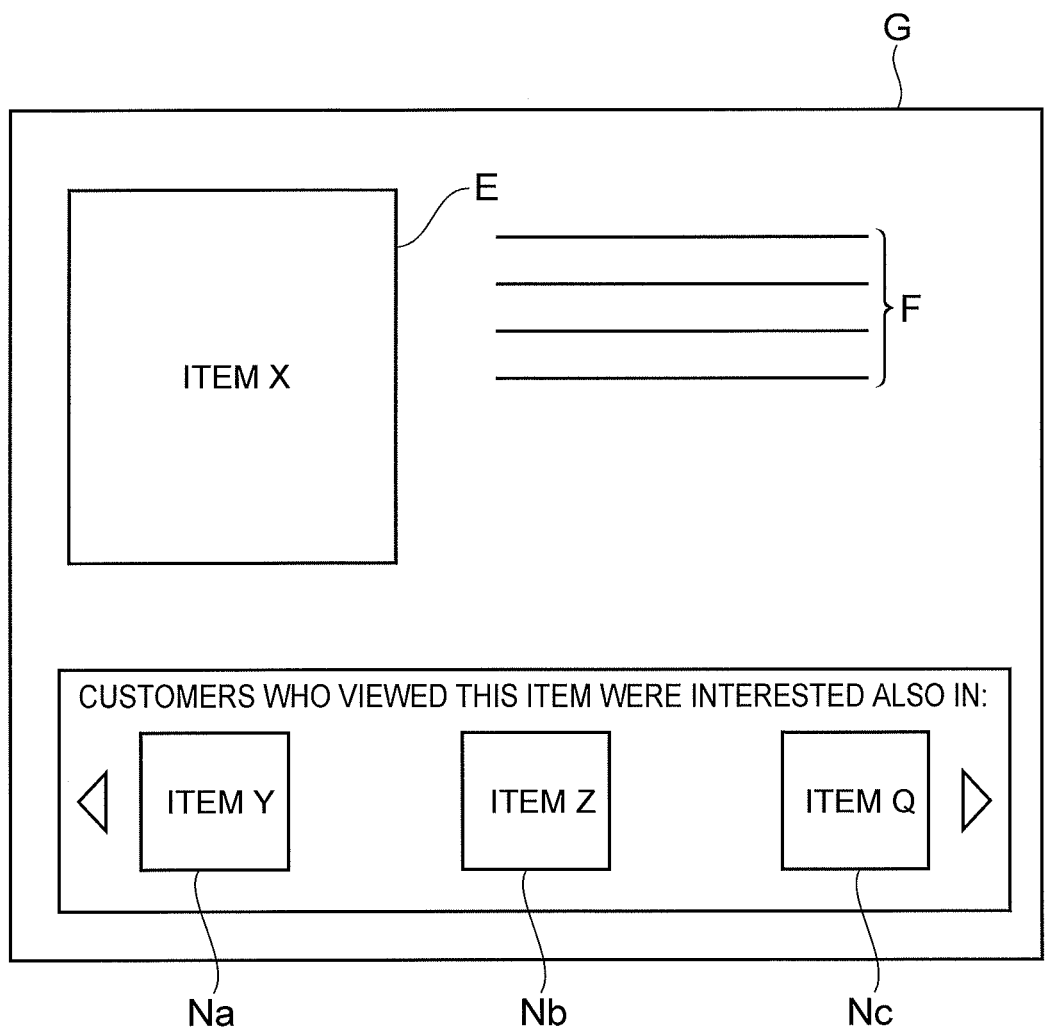
FIG. 6 is a diagram showing an example of display of a retrieval result on a user terminal shown in FIG. 1.

FIG. 6 shows a display example of a retrieval result on the user terminal T. On a screen G in FIG. 6, an image E and a description F of the item X, which is the designated item information, are displayed. Further, in the lower part of the screen G, images of the items Y, Z and Q, which are the associated item information, are displayed as thumbnails Na, Nb and Nc, respectively. The order of display of the associated item information is based on the sorting by the retrieval unit 37 described above. By clicking on the thumbnail, a user can view the details of the associated item which the user has not been interested in when making a search. Thus, the associated item information is information for recommending the item to the user.

Hereinafter, the operation of the EC server 30 shown in FIG. 1 is described and further a retrieval method according to this embodiment is described with reference to FIGS. 7 and 8.

Figure 7:
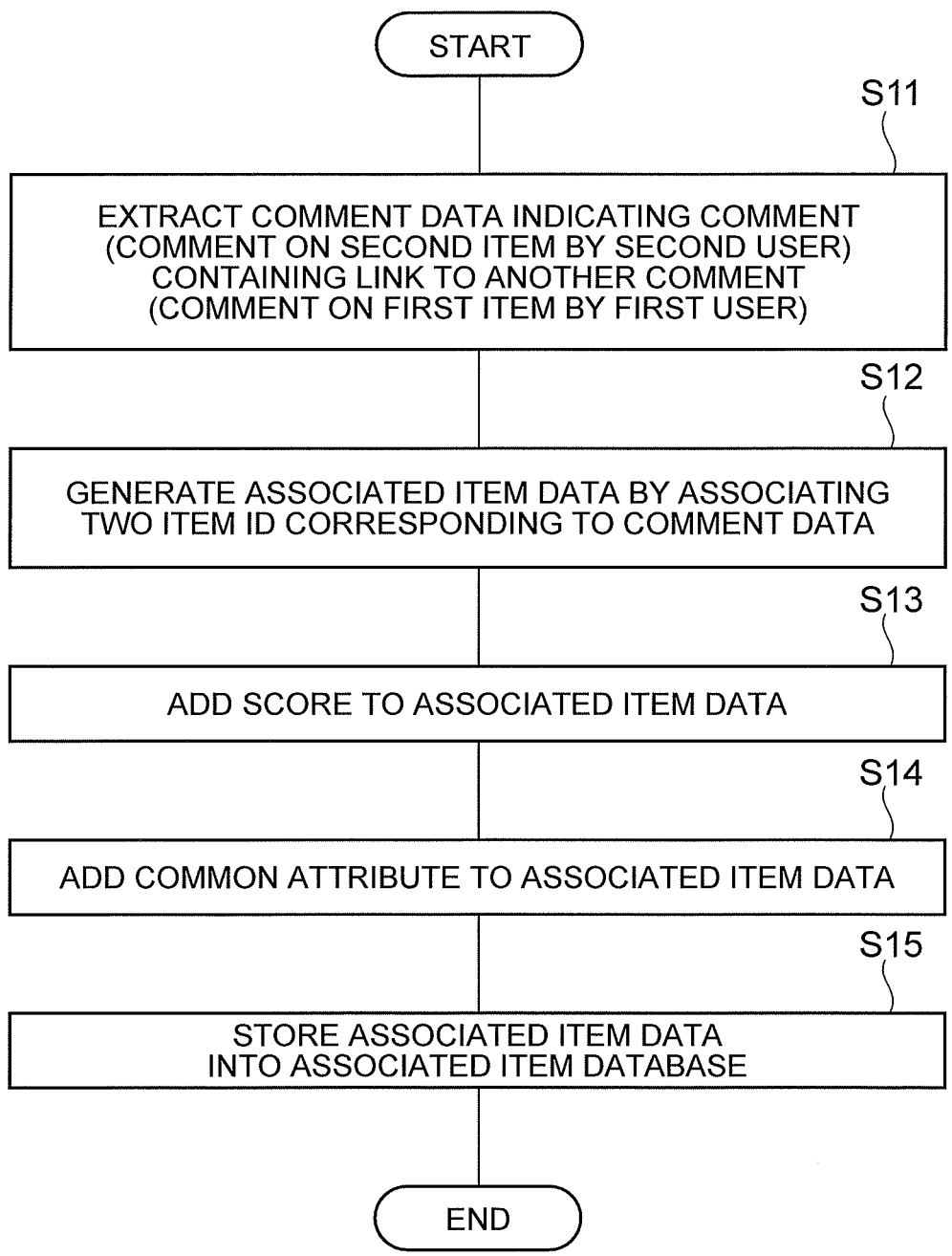
FIG. 7 is a diagram showing an associated item data generation process in the EC server shown in FIG. 1.

The associated item data based on which the retrieval process is performed is generated as shown in FIG. 7. First, the extraction unit 33 extracts comment data indicating a comment (referring comment, second comment) containing a link to another comment (referred comment, first comment) from the comment database 10 (Step S11, extraction step). Note that a comment author and an item on which the comment is made are different between the referred comment and the referring comment. In this extraction, when the referred comment cannot be specified from the link, the extraction unit 33 estimates the referred comment by comparing a difference in written time between the comments with a threshold Th.

Next, the association unit 34 generates the associated item data based on each of the extracted comment data (association step). First, the association unit 34 associates two item IDs corresponding to the comment data with each other and thereby generates the associated item data (Step S12). Then, the association unit 34 adds the score to the associated item data based on morphological analysis or comparison of item categories (Step S13). After that, the association unit 34 adds the common attribute to the associated item data based on the user attributes of two users who have made the comments (Step S14). Finally, the association unit 34 stores the processed associated item data into the associated item database 35 (Step S15).

Figure 8:
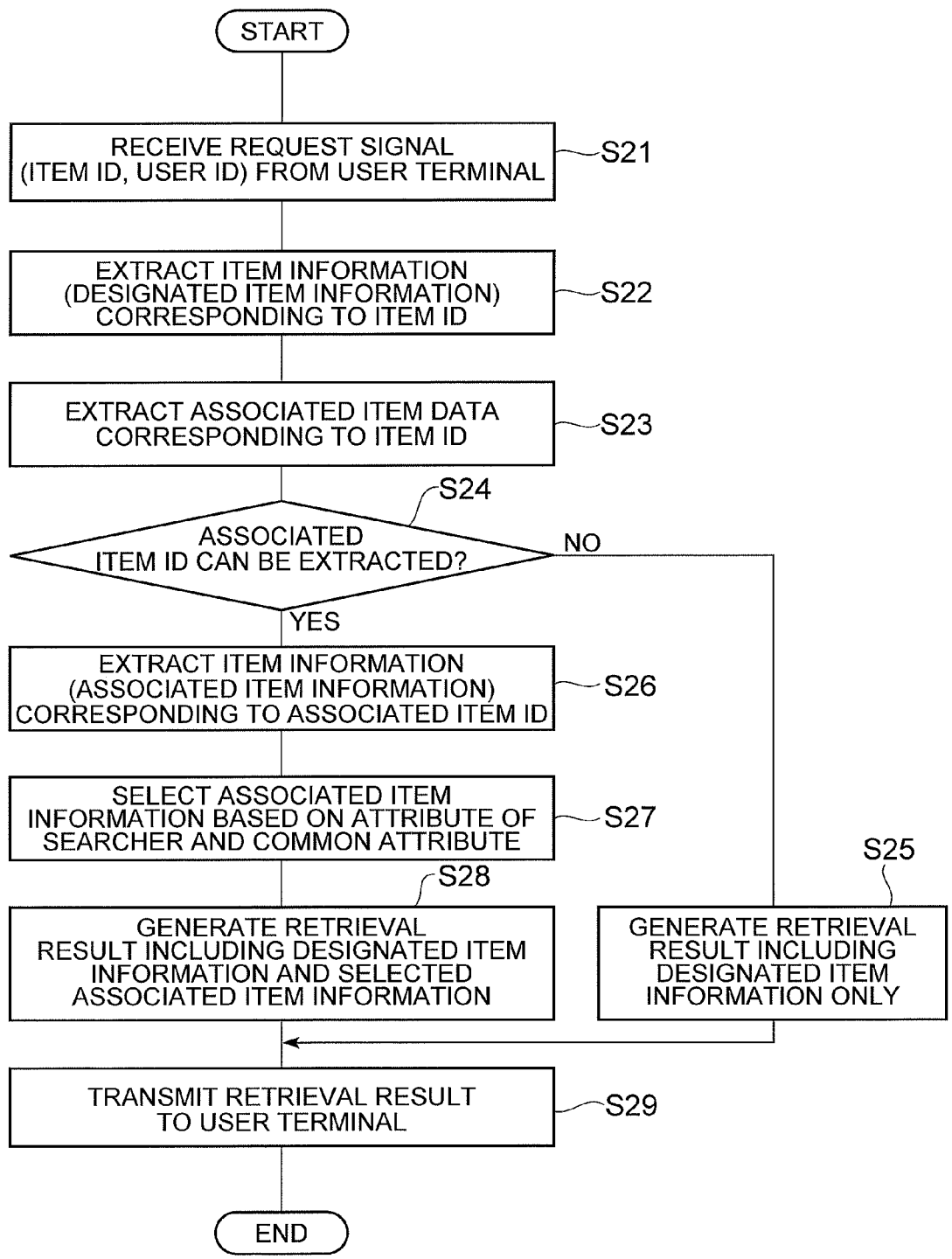
FIG. 8 is a diagram showing a retrieval process in the EC server shown in FIG. 1.

The retrieval process is performed as shown in FIG. 8. First, the receiving unit 36 receives the request signal from the user terminal T (Step S21, receiving step). The request signal contains the item ID and the user ID.

Next, the retrieval process by the retrieval unit 37 is performed (retrieval step). Specifically, the retrieval unit 37 extracts the item information corresponding to the item ID extracted from the request signal as the designated item information from the item database 31 (Step S22). Then, the retrieval unit 37 extracts the associated item data corresponding to the item ID from the associated item database 35 (Step S23).

In the case where the associated item data cannot be extracted (NO in Step S24), the retrieval unit 37 generates a retrieval result including the designated item information only (Step S25).

On the other hand, in the case where the associated item data can be extracted (YES in Step S24), the retrieval unit 37 extracts the item information corresponding to the associated item ID as the associated item information from the item database 31 (Step S26). Then, based on the user attribute of the searcher and the common attribute of the associated item information, the retrieval unit 37 selects the associated item information where the attribute of the searcher corresponds to the common attribute (Step S27). The retrieval unit 37 then generates a retrieval result containing the designated item information and the selected associated item information (Step S28). At this time, the retrieval unit 37 sorts the associated item information based on the score according to need.

After the retrieval result is generated in the above manner, the transmitting unit 38 transmits the retrieval result to the user terminal T (Step S29, transmitting step).

Figure 9:
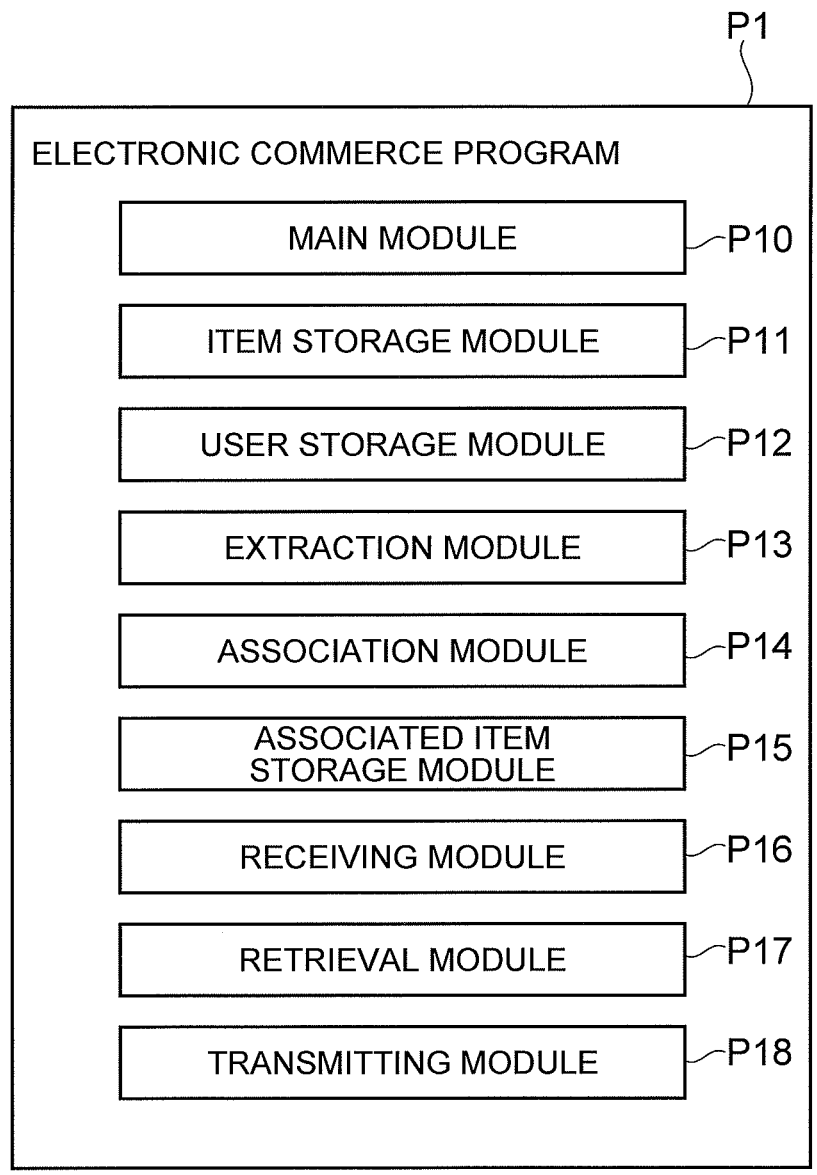
FIG. 9 is a diagram showing the configuration of an electronic commerce program according to an embodiment.

An electronic commerce program (retrieval program) P1 that causes a computer to function as the EC server 30 is described hereinafter with reference to FIG. 9.

The electronic commerce program P1 includes a main module P10, an item storage module P11, a user storage module P12, an extraction module P13, an association module P14, an associated item storage module P15, a receiving module P16, a retrieval module P17, and a transmitting module P18.

The main module P10 is a part that exercises control over the electronic commerce function. The functions implemented by the item storage module P11, the user storage module P12, the extraction module P13, the association module P14, the associated item storage module P15, the receiving module P16, the retrieval module P17, and the transmitting module P18 are the same as the functions of the item database 31, the user database 32, the extraction unit 33, the association unit 34, the associated item database 35, the receiving unit 36, the retrieval unit 37, and the transmitting unit 38, respectively.

The electronic commerce program P1 is provided by being recorded on a tangible recording medium such as CD-ROM, DVD, ROM, or semiconductor memory, for example. Further, the electronic commerce program P1 may be provided as a data signal superimposed on a carrier wave through a communication network.

As described above, according to this embodiment, when one comment (comment on a second item by a second user) contains a link to another comment (a link to a comment on a first item by a first user), two items corresponding to those comments are associated with each other. Then, when a request related to one of the two items is sent from the user terminal T, not only information (designated item information) about the one item but also information (associated item information) about the other item associated with that item is extracted, and those item information are sent to the user terminal T. In this manner, because the items are associated with each other depending on the presence or absence of a link to a comment on another item, it is possible to associate the items without depending on a word in the comment and present the item information to a user.

By recommending the item associated based on a link to a comment to a user, it is possible to present the items which are worth being compared at the same time or present the associated item with strong appeal to the user. This is the effect that cannot be obtained from a recommendation on the basis of the viewing history or purchase history of a user.

Further, in this embodiment, a different score is added to the associated item data depending on whether a specified word is contained in the comment or not. Then, when the associated item information is displayed on the user terminal T, the associated item information with the higher score is displayed preferentially. In this manner, by displaying the associated item information on the user terminal T according to the score set in accordance with the content of the comment, it is possible to enhance the appeal of the presented information and enhance the convenience of search. For example, because the score is higher when it is concluded that contrast is made to another item, it is possible to accurately estimate the degree of association between items and enhance the appeal and convenience.

Further, in the case where a different score is added to the associated item data depending on whether the categories of items are common or not, the associated item information is displayed on the user terminal T according to the score set in accordance with the commonality between item categories. In this case also, it is possible to enhance the appeal of the presented information and enhance the convenience of search, just like in the case of setting the score based on a word.

Further, in this embodiment, the user attribute common to the two users who have made comments is added to the associated item data. Then, only when the common attribute of the associated item information corresponds to the user attribute of a searcher, the designated item information is sent to the user terminal T. In this manner, by selecting the associated item information to be presented based on the degree of correspondence of the user attribute, it is possible to enhance the appeal of the presented information and enhance the convenience of search.

Further, in this embodiment, when a linked comment cannot be uniquely specified, the linked comment is determined based on a difference in written time between comments. Specifically, when a difference between the written time of a referring comment and the written time of a comment (candidate comment) by another user which is likely to be a linked comment is equal to or less than a specified threshold, the candidate comment is determined as the linked comment. The associated item data is then generated based on the determination result. In this manner, by associating the comments with each other based on the closeness of the created time of the comments, it is possible to associate items with each other with high accuracy even when a linked comment cannot be uniquely specified.

Hereinbefore, the present invention has been described in detail with respect to the embodiment thereof. However, the present invention is not limited to the above-described embodiment. Various changes and modifications may be made therein without departing from the scope of the invention.

Although the score and the common attribute are added to the associated item data in the above-described embodiment, those processing may be omitted. When the setting of the score is omitted, the associated item information may be sorted on the basis of the attribute other than the score or the sorting may be omitted. When the setting of the common attribute is omitted, the retrieval means may retrieve the designated item information and the associated item information simply based only on the item ID.

Although the referred comment is estimated based on a difference in written time when the referred comment cannot be uniquely specified in the above-described embodiment, such an estimation process is not necessarily made. For example, when the referred comment can be always specified, the extraction means and the association means may specify the referred comment from the link in the referring comment.

Note that, although the EC server 30 is composed of one computer in the example of FIG. 4, the functions of the EC server 30 may be distributed among a plurality of computers. For example, the EC server 30 may be composed of a computer having the databases shown in FIG. 3 and a computer having the other functions. Further, the EC server 30 may be composed of a computer that includes a component having the function of generating the associated item data (the function corresponding to the process of FIG. 7) and a computer that includes a component having the retrieval function (the function corresponding to the process of FIG. 8).

The configurations of the servers are also not limited to the above-described embodiment. For example, a server having the functions of the comment database 10 and the EC server 30 may be prepared. Further, in the case where the redirection to the item URL is not performed, the redirect server 20 may be omitted. Further, an EC system that includes a plurality of servers that share the functions of the EC server 30 may be constructed as described above.

REFERENCE SIGNS LIST

1 . . . EC system (retrieval system), 10 . . . comment database (comment storage means), 20 . . . redirect server, 30 . . . EC server (retrieval device), 31 . . . item database (item storage means), 32 . . . user database (user storage means), 33 . . . extraction unit (extraction means), 34 . . . association unit (association means), 35 . . . associated item database (associated item storage means), 36 . . . receiving unit (receiving means), 37 . . . retrieval unit (retrieval means), 38 . . . transmitting unit (transmitting means), P1 . . . electronic commerce program (retrieval program), P10 . . . main module, P11 . . . item storage module, P12 . . . user storage module, P13 . . . extraction module, P14 . . . association module, P15 . . . associated item storage module, P16 . . . receiving module, P17 . . . retrieval module, P18 . . . transmitting module, T . . . user terminal

The invention claimed is:

1. A retrieval device comprising:
an extraction unit for referring to a comment storage unit for storing comment data indicating a comment on an item by a user and extracting comment data indicating a second comment containing a uniform resource locator (URL) link to a first comment, the first comment being a comment on a first item by a first user and the second comment being a comment on a second item by a second user;
an association unit for generating associated item data indicating that the first and second items are associated with each other based on that the second comment indicated by the second comment data extracted by the extraction unit contains the URL link to the first comment, and storing the associated item data into an associated item storage unit;
a receiving unit for receiving a request for information about one item of the first and second items from a user terminal;
a retrieval unit for referring to an item storage unit for storing item information and extracting designated item information about the one item corresponding to the request received by the receiving unit, and referring to the item storage unit and the associated item storage unit and extracting associated item information about another item of the first and second items; and
a transmitting unit for transmitting the designated item information and the associated item information extracted by the retrieval unit to the user terminal,
wherein the association unit determines whether a specified word is included in the second comment indicated by the extracted comment data and, when the specified word is included, adds a higher score to the associated item data than when not,
wherein, when a plurality of associated item information are extracted, the retrieval unit sorts the plurality of associated item information so that the associated item information with the higher score is displayed preferentially on the user terminal, and
wherein the specified word is a word from which it can be estimated that the second comment is made on the first item indicated by the first comment already made by the first user.

2. The retrieval device according to claim 1, wherein
the association unit determines whether categories of the first and second items are common by referring to the item storage unit and, when the categories are common, adds a higher score to the associated item data than when not, and
when a plurality of associated item information are extracted, the retrieval unit sorts the plurality of associated item information so that the associated item information with the higher score is displayed preferentially on the user terminal.

3. The retrieval device according to claim 1, wherein
the association unit refers to a user storage unit for storing user information and adds a user attribute common to the first and second users to the associated item data, and
the retrieval unit extracts the user information about a user of the user terminal from the user storage unit and, when a user attribute indicated by the user information corresponds to the common user attribute added to the extracted associated item information, determines to transmit the associated item information to the user terminal and, when not, determines not to transmit the associated item information to the user terminal.

4. The retrieval device according to claim 1, wherein
when the first comment cannot be uniquely specified from the link contained in the second comment, the extraction unit determines that the link is a link to a comment by the first user when a difference between created time of the comment by the first user and created time of the second comment is equal to or less than a specified threshold, and
the association unit generates the associated item data, treating an item on which the comment by the first user determined to be a linked comment is made as the first item.

5. A retrieval system comprising:
an extraction unit for referring to a comment storage unit for storing comment data indicating a comment on an item by a user and extracting comment data indicating a second comment containing a uniform resource locator (URL) link to a first comment, the first comment being a comment on a first item by a first user and the second comment being a comment on a second item by a second user;
an association unit for generating associated item data indicating that the first and second items are associated with each other based on that the second comment indicated by the second comment data extracted by the extraction unit contains the URL link to the first comment, and storing the associated item data into an associated item storage unit;
a receiving unit for receiving a request for information about one item of the first and second items from a user terminal;
a retrieval unit for referring to an item storage unit for storing item information and extracting designated item information about the one item corresponding to the request received by the receiving unit, and referring to the item storage unit and the associated item storage unit and extracting associated item information about another item of the first and second items; and
a transmitting unit for transmitting the designated item information and the associated item information extracted by the retrieval unit to the user terminal,
wherein the association unit determines whether a specified word is included in the second comment indicated by the extracted comment data and, when the specified word is included, adds a higher score to the associated item data than when not,
wherein, when a plurality of associated item information are extracted, the retrieval unit sorts the plurality of associated item information so that the associated item information with the higher score is displayed preferentially on the user terminal, and
wherein the specified word is a word from which it can be estimated that the second comment is made on the first item indicated by the first comment already made by the first user.

6. A retrieval method executed by a computer, comprising:
an extraction step of referring to a comment storage unit for storing comment data indicating a comment on an item by a user and extracting comment data indicating a second comment containing a uniform resource locator (URL) link to a first comment, the first comment being a comment on a first item by a first user and the second comment being a comment on a second item by a second user;

an association step of generating associated item data indicating that the first and second items are associated with each other based on that the second comment indicated by the second comment data extracted in the extraction step contains the URL link to the first comment, and storing the associated item data into an associated item storage unit;

a receiving step of receiving a request for information about one item of the first and second items from a user terminal;

a retrieval step of referring to an item storage unit for storing item information and extracting designated item information about the one item corresponding to the request received in the receiving step, and referring to the item storage unit and the associated item storage unit and extracting associated item information about another item of the first and second items; and a transmitting step of transmitting the designated item information and the associated item information extracted in the retrieval step to the user terminal, wherein the association step comprises determining whether a specified word is included in the second comment indicated by the extracted comment data and, when the specified word is included, adding a higher score to the associated item data than when not, wherein the retrieval step comprises, when a plurality of associated item information are extracted, sorting the plurality of associated item information so that the associated item information with the higher score is displayed preferentially on the user terminal, and wherein the specified word is a word from which it can be estimated that the second comment is made on the first item indicated by the first comment already made by the first user.

7. A non-transitory computer-readable recording medium storing a retrieval program causing a computer to function as:

an extraction unit for referring to a comment storage unit for storing comment data indicating a comment on an item by a user and extracting comment data indicating a second comment containing a uniform resource locator (URL) link to a first comment, the first comment being a comment on a first item by a first user and the second comment being a comment on a second item by a second user;

an association unit for generating associated item data indicating that the first and second items are associated with each other based on that the second comment indicated by the second comment data extracted by the extraction unit contains the URL link to the first comment, and storing the associated item data into an associated item storage unit;

a receiving unit for receiving a request for information about one item of the first and second items from a user terminal;

a retrieval unit for referring to an item storage unit for storing item information and extracting designated item information about the one item corresponding to the request received by the receiving unit, and referring to the item storage unit and the associated item storage unit and extracting associated item information about another item of the first and second items; and a transmitting unit for transmitting the designated item information and the associated item information extracted by the retrieval unit to the user terminal, wherein the association unit determines whether a specified word is included in the second comment indicated by the extracted comment data and, when the specified word is included, adds a higher score to the associated item data than when not, wherein, when a plurality of associated item information are extracted, the retrieval unit sorts the plurality of associated item information so that the associated item information with the higher score is displayed preferentially on the user terminal, and wherein the specified word is a word from which it can be estimated that the second comment is made on the first item indicated by the first comment already made by the first user.

* * * * *